United States Patent [19]

Naumann

[11] Patent Number: 4,723,734

[45] Date of Patent: Feb. 9, 1988

[54] SPACE ULTRA-VACUUM FACILITY AND METHOD OF OPERATION

[75] Inventor: Robert J. Naumann, Huntsville, Ala.

[73] Assignee: The United States of America as represented by the Administrator of the National Aeronautics and Space Administration, Washington, D.C.

[21] Appl. No.: 911,851

[22] Filed: Sep. 26, 1986

[51] Int. Cl.$^4$ .............................................. B64G 1/66
[52] U.S. Cl. .................... 244/158 R; 134/2; 427/248.1; 156/610; 118/715
[58] Field of Search ................ 244/158 R; 134/2, 19, 134/21; 427/248.1, 294; 156/610; 118/715

[56] References Cited

PUBLICATIONS

Predmore et al., "Exospheric Cleaning of the Earth Radiation Budget Solar Radiometer during Solar Max.", SPIE, vol. 338, pp. 104, 110–112.
Oran et al., NASA Conference Publication, NASA-CP-2091, Jun. 1979, pp. I-1→I-2, II-1→II-56.

Primary Examiner—Galen Barefoot
Attorney, Agent, or Firm—William J. Sheehan; John R. Manning; Leon D. Wofford, Jr.

[57] ABSTRACT

A wake shield space processing facility (10) for maintaining ultra-high levels of vacuum is described. The wake shield (12) is a truncated hemispherical section having a convex side (14) and a concave side (24). Material samples (68) to be processed are located on the convex side of the shield, which faces in the wake direction in operation in orbit. Necessary processing fixtures (20) and (22) are also located on the convex side. Support equipment including power supplies (40, 42), CMG package (46) and electronic control package (44) are located on the convex side (24) of the shield facing the ram direction. Prior to operation in orbit the wake shield is oriented in reverse with the convex side facing the ram direction to provide cleaning by exposure to ambient atomic oxygen. The shield is then baked-out by being pointed directed at the sun to obtain heating for a suitable period.

16 Claims, 11 Drawing Figures

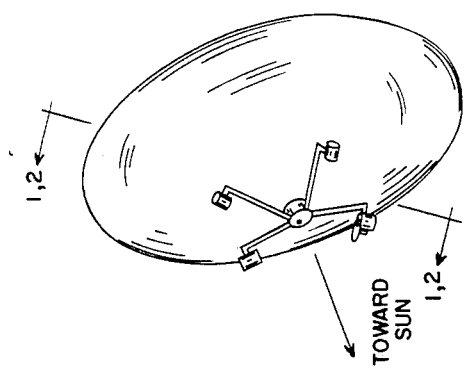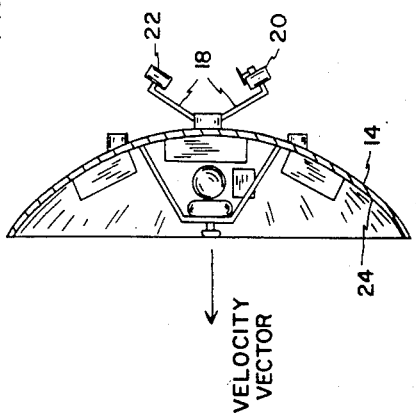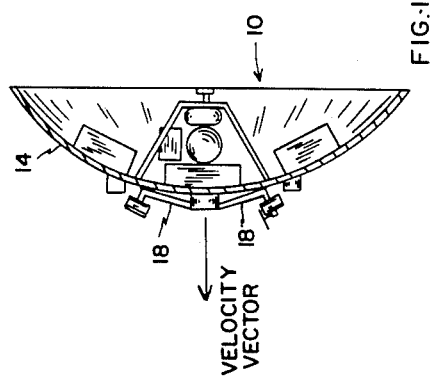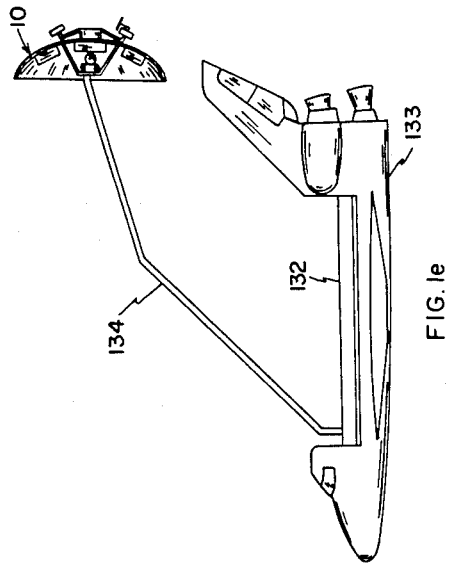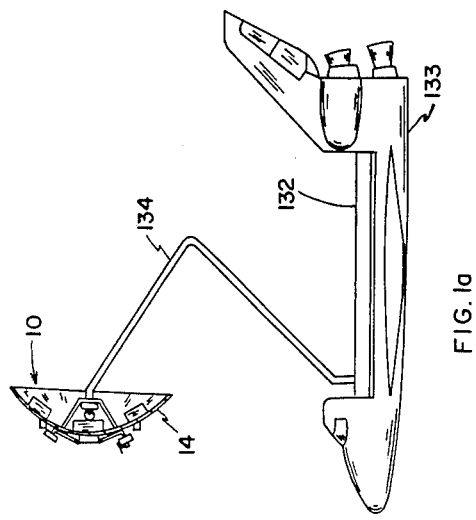

SPACE ULTRA-VACUUM FACILITY AND METHOD OF OPERATION

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to processing of materials and more particularly to apparatus for processing materials in space under ultra-high vacuum levels.

Attainment of the ultra-high vacuum conditions required for certain material processing applications has been a continuous problem. For example, in growing thin films by molecular beam epitaxy (MBE), atoms are typically being deposited on a target surface at the rate of $10^{15} cm^2/sec$, which corresponds to a film growth of 1 micron per hour. At this growth rate a background vacuum level of $10^{-11}$ to $10^{-12}$ torr can incorporate as much as 1 ppm impurity if the contaminating molecules chemisorb on the surface. This would present an unacceptably high dopant level if the impurity is electrically active. Residual backgrounds of $H_2O$, $O_2$, $CO$, $CO_2$, $CH_4$, $N_2$, various silicones and metal or semi-metal atoms are particularly troublesome. The MBE process is especially susceptible to chamber contamination, and great care must be taken to avoid introducing any extraneous materials into an MBE chamber for fear of ruining a very expensive facility. This essentially requires a dedicated chamber for each particular type of process and restricts experimentation with various materials, for example mixed III–V/II–VI systems. As a result of these difficulties MBE has been kept in the realm of a research process and its development has been retarded despite is significant promise for growing precision epi-layers and superlattices.

Conventional ultra-high vacuum chambers can attain vacuums in the rage of $10^{-10}$ to $10^{-12}$, but they require extensive bake-out and other time-consuming maintenance. In addition to the problems mentioned above, these systems have difficulty in maintaining good vacuum in the presence of large gas loads such as those involved in growing thin films by metal-organic chemical vapor deposition (MOCVD) or in the presence of high heat loads in deposition on substrates that are heated to improve the mobility of the ad-atoms, or in the ultra-purification processes where samples are heated to remove impurities by evaporation or other means.

Use of the vacuum environment of outer space for performing ultra-high vacuum processing has been proposed for many years. In general the prior concepts use a shell-shaped wake shield in which the process is carried out, the wake shield being disposed to trail behind an orbiting vehicle. In the concept studied in most detail a hemispherical shell wake shield would be attached by a tether or long telescoping boom and flown behind the Space Shuttle with the open end of the hemisphere facing the wake direction. The material being processed as well as process equipment and support packages would all be located on the concave side, facing the wake direction. This concept further envisioned closing the shield with a hinged matching hemisphere, pumping the system down and baking it out prior to loading on the Shuttle. Auxillary pumping would likely be required to maintain the vacuum until deployment on orbit, when the hemisphere would be opened.

The prior wake shield concept presents weaknesses in obtaining the desired ultra-high vacuum levels. The walls of the hemisphere, which partially surround the surface being processed, can act as a source of contamination and negate some of the advantages of using the vacuum of space. Also, the curved portion of the walls face in the ram direction. Residual atmospheric molecules striking these walls can become accommodated and re-emitted with thermal velocities. The geometry of the system is such that these thermal molecules can get behind the shield. Since they are traveling at much slower velocities than the ambient molecules, the thermal molecules can backscatter ambient molecules into the region protected by the shield. This would probably be the limiting factor in the level of vacuum attainable by such a shield.

It is therefore an object of the invention to provide an ultra-high vacuum processing facility in which contamination is virtually eliminated.

Another object is to provide a wake shield space vacuum facility in which backscatter of contaminants onto surfaces being processed is minimized.

Another object is to provide a method of deploying a wake shield facility in a manner such as to provide for cleaning and bake-out of the shield surface on the side where processing is carried out.

SUMMARY OF THE INVENTION

In the present invention a truncated hemispherical wake shield is used, with the material to be processed being located at the apex on the convex side, facing the wake direction. Necessary support equipment for the facility such as power supplies, electronic support modules and control moment gyroscopes are located on the concave side facing the ram direction. This arrangement presents several advantages and avoids problems associated with the prior approach. There are no walls that could serve as sources of contamination in the line of sight of the surface to be processed. Any outgassing molecules from the support equipment are prevented from drifting behind the shield. The arrangement also prevents atmospheric molecules that are accommodated on the forward face of the shield from being re-emitted in the wake direction. Backscattering of ambient atmospheric molecules onto the processing surface upon collision with these thermal molecules is therefore prevented.

BRIEF DESCRIPTION OF THE DRAWINGS

FIG. 1 is a schematic view showing the sequence of steps used in deployment, preparation for operation, operation and retrieval of the ultra-high vacuum facility;

FIG. 1a shows the facility being deployed from the Space Shuttle;

FIG. 1b shows the orientation of the facility during an initial cleaning step;

FIG. 1c shows the facility oriented toward the sun during a bake-out step;

FIG. 1d shows the facility oriented for performance of space processing;

FIG. 1e shows the facility being retrieved by the Space Shuttle;

DESCRIPTION OF A PREFERRED EMBODIMENT

Figure 2:
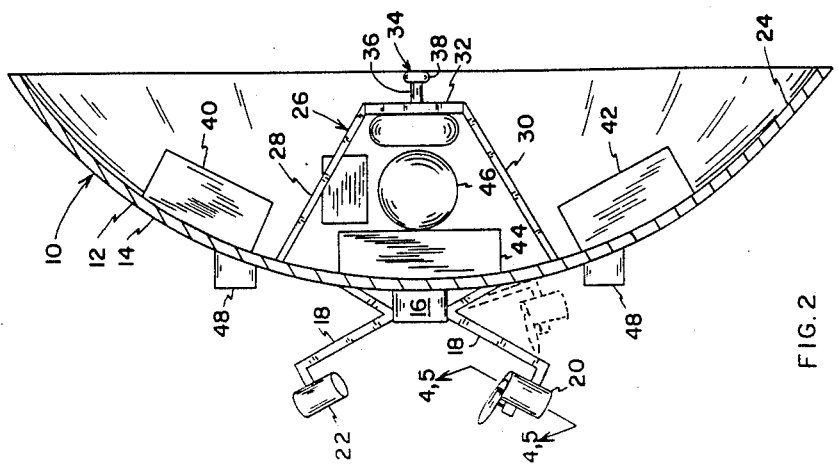
FIG. 2 is an elevational view, partly in section, of a wake shield vacuum facility embodying the invention.

Referring to FIG. 2 of the drawings a space vacuum processing facility is shown. The apparatus 10 has a wake shield 12 in the shape of a truncated, hollow hemispherical section, one side 14 of the shield being convex and the other side 24 concave. The shield surface is preferably made of material that has low out-gassing characteristics such as stainless steel. A material sample supporting fixture in the form of a carousel 16 is disposed on the convex side of the shield at its apex. Movable arms 18, also on the convex side, are connected by the shield by means not shown in proximity to the carousel, the arms supporting processing fixtures 20, 22 and providing for movement of the fixtures to predetermined locations required for producing interactions with material samples. For MBE processes fixture 18 is a gun that produces and projects a stream of vaporized material onto a sample surface to deposit a thin layer of material in a controlled manner. Fixture 22, mounted on another arm 18, is a surface diagnostic instrument including optical components for observing the deposition process and providing information necessary for process control. The fixtures are oriented to face the surface of the sample being processed when in their extended position, and when not in use they are retractable by arms 18 to a storage position as shown in phantom for fixture 20.

Concave side 24 of the shield has a support structure 26 including metal struts 28 and 30 connected to the shield and extend radially inward. The struts are joined to end plate 32 disposed parallel to the outer edge of the shield. Grappling fixture 34, include a rod 36 secured to grappling knob 38, is disposed outward from plate 32 to enable grasping of the shield by a boom arm during deployment and retrieval. Support packages for equipment which is not required to be in close proximity to the processing site are disposed on the concave side of the shield. Such packages in the embodiment shown include power supplies 40, 42, an electronic control package 44 and a control moment gyroscope (CMG) package for orienting the shield in any required direction. A docking ring 48 may be provided as necessary for deployment or placement in the Space Shuttle or Space Station.

Figure 3:
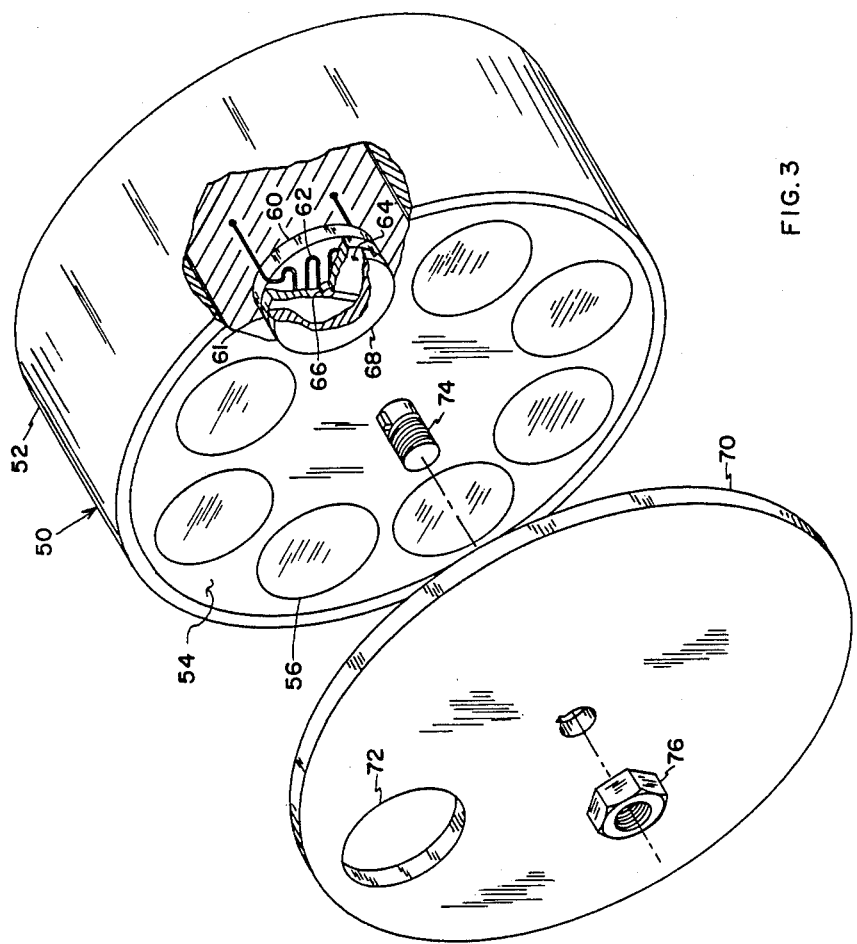
FIG. 3 is a pictorial view, partly cut away, showing a carousel device used for supporting and positioning sample surfaces for processing.

FIG. 3 shows a carousel fixture 50 for supporting material samples and moving them in position for processing. The carousel includes a cylindrical metal housing 52 in which a rotatable cylindrical support block 54 is disposed. A plurality of sample assemblies 56 are disposed around the periphery of the block, each assembly supporting a sample substrate in a position such that its surface may be exposed for processing. Each assembly includes a layer 60 of refractory insulation, electrical heating element 62 disposed over the insulation layer, a metal heat leveler plate 64, disposed over and in contact with the heating element, a thermocouple 66 in heat-transfer relation with plate 44 and a sample substrate 68 supported on top of plate 44.

The support block 54 is rotatable by shaft 74 to the desired circumferential position for alignment of a particular sample substrate with MBE gun 20. A circular cover plate 70 has an opening 72 corresponding in size to substrate 68 so that an incoming stream of vapor may contact the substrate. Cover 70 is secured to shaft 74 by nut 76.

Figure 4:
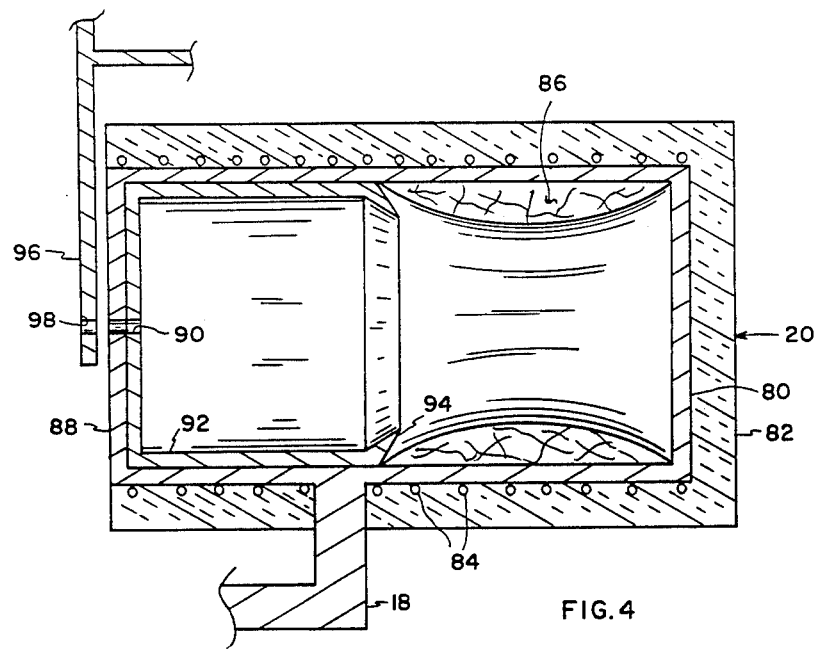
FIG. 4 is a sectional view taken through line 4—4 of FIG. 2 showing one embodiment of a device for projecting process material vapor onto a sample surface.

One embodiment of an MBE gun 22 for producing and projecting a stream of vaporized material is shown in FIG. 4. Inasmuch as conventional MBE guns for use under a normal gravity environment rely upon gravitational effects to retain the melt in the proper position, a special microgravity design is required. The gun 22 has a cylindrical metal housing 80 and layer of refractory insulation 82 enclosing the housing with heater wires 42 embedded in the insulation adjacent the housing. A charge 86 of process material such as elemental Ga,As, Hg,Cd,Te or other is disposed in the form of a ring in contact with the inside of the housing over a section extending longitudinally to the center of the housing. The remainder portion of the housing is provided with an internal barrier lines 92 having a lip projecting toward the closed end of the housing. The housing has an end plate 88 penetrated at its center by orifice 90. Outside the housing a rotatable shutter with an orifice 98 is provided. The gun shown in this embodiment operates by means of surface tension effects related to differences in wetability by the charge material of the housing surface at the end of the gun and liner 82, the former but not the latter being wetable by the melt. This prevents the melt from spreading to the orifice region where it could block the orifice region in liquid instead of vapor form.

Figure 5:
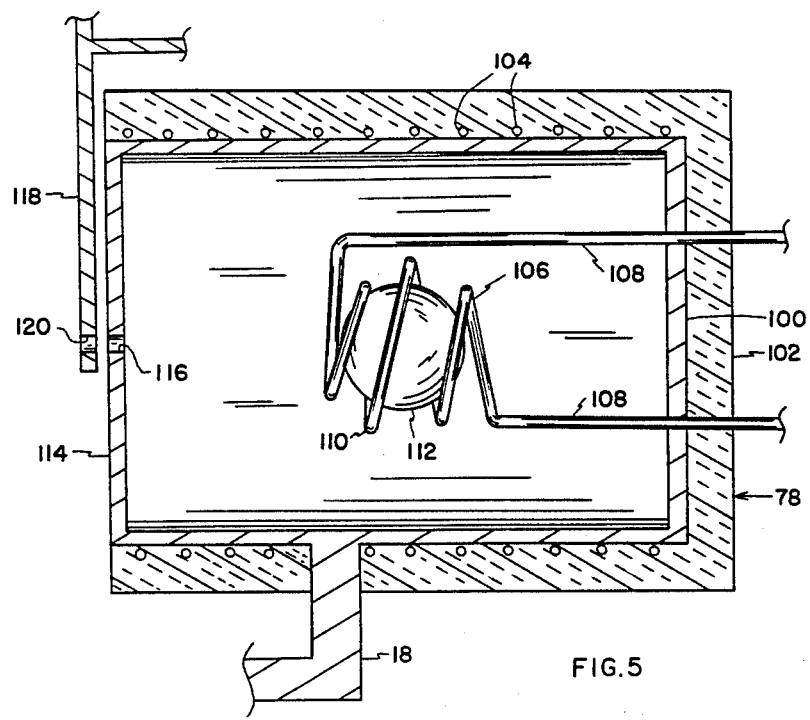
FIG. 5 is a sectional view taken through line 5—5 of FIG. 2 showing another embodiment of such a device.

FIG. 5 shows another embodiment of an MBE gun for use in microgravity. The gun has a cylindrical housing 100 encased by a layer of refractory insulation 102 having heater wires 104 embedded in the insulation adjacent the housing surface. An RF heating coil 106 is disposed in the center of the housing coil for support of a material charge 112 by means of electromagnetic levitation. The heating coil has legs 108 extending through the end of the housing and a plurality of turns 110 forming a central levitation region. The housing has a circular end plate 114 penetrated at its center orifice 116 for passage of vaporized process material. A rotating shutter 118 with an orifice 120 is disposed outside the housing, the shutter being rotatable for alignment of orifices 116 and 118 in operation. Use of non-contact positioning prevents any container - induced contamination.

The steps to be used in deploying the wake shield facility, preparing it for operation, operating the facility and retrieving it are shown in FIG. 1. In FIG. 1a the apparatus 10 is shown being deployed from the cargo bay 132 of the Space Shuttle by means of boom arm 134. The wake shield is initially deployed with convex side 14 facing forward to enable exposure of that side to the flux of atomic oxygen existing in space.

As shown in FIG. 1b after being released so as to operate in a free-flyer mode the wake shield is orbited with the convex side in the forward or ram direction in order to clean its surface. Atomic oxygen is very effective in removing any remaining hydrocarbon contaminants on the surface that could outgas and cause backscattering to the material surface being processed.

The wake shield is then oriented to point directly toward the sun as shown in FIG. 1c. The polished metal surface of the wake shield becomes hot when facing the sun owing to the low emissivity of the stainless steel surface, and such heating serves to effectively bake-out the facility and further reduce outgassing. After bake-out the wake shield is oriented as shown in FIG. 1d with concave side 24 in the ram direction and convex side 14 in the wake direction for reasons discussed above, and processing fixtures 20, 22 are deployed outwardly by arms 18 to their operating position. Process operation is then started. Upon completion of processing, apparatus 10 is retrieved by boom arm 134 for return to cargo bay 132.

Figures 6, 7:
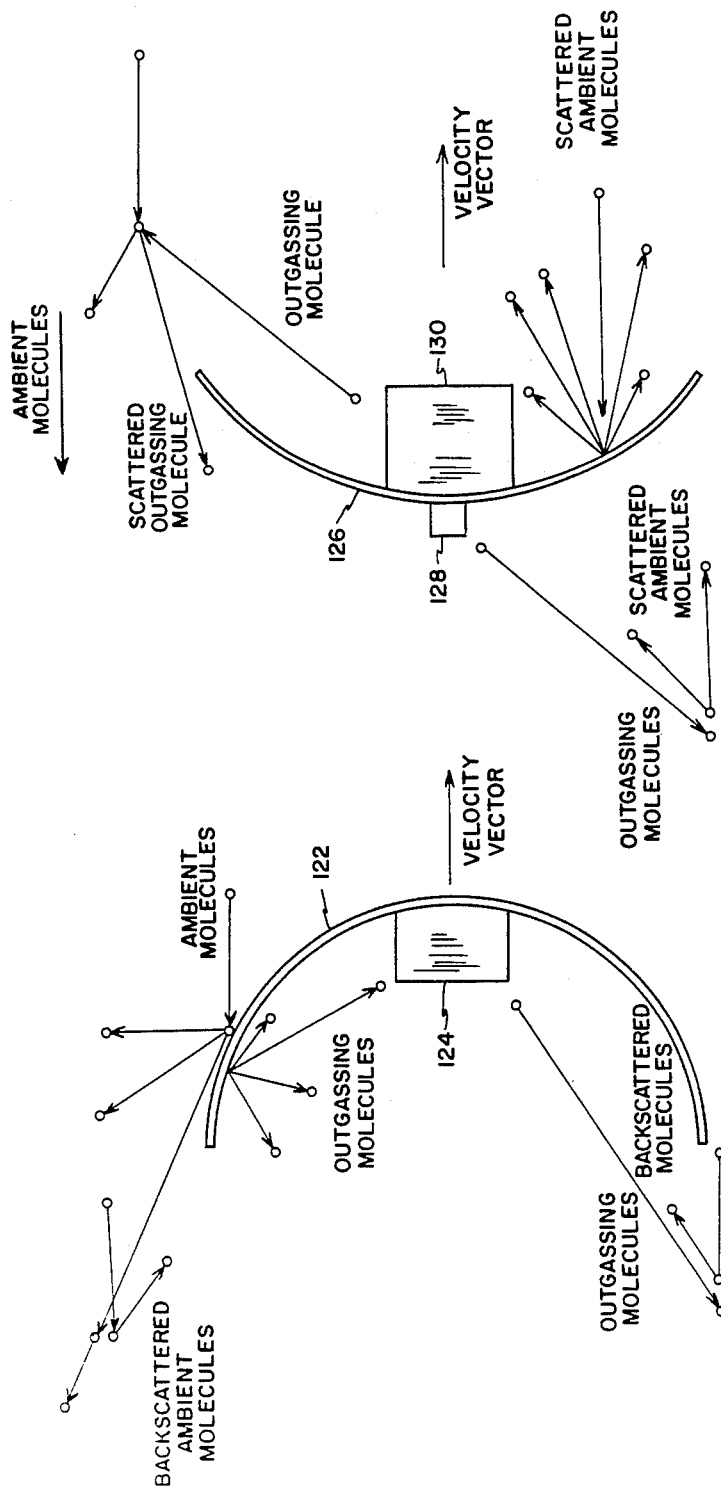
FIG. 6 is a cut away view showing backscatter and outgassing phenomena associated with the prior art wake shield arrangement.
FIG. 7 is a cut away view showing how contamination from these phenomena is prevented in the present invention.

FIG. 6 shows a prior art wake shield 122 wherein the experiment region 124 including the material to be processed as well as support equipment is located on the concave side of the shield facing the wake direction. As depicted region 124 is susceptible to contamination by outgassing molecules from the walls land by backscattered molecules produced by collision of thermal outgassed molecules with high energy ambient molecules. These phenomena place a practical limit on the level of vacuum that can be maintained at the experiment region in this type of facility.

FIG. 7 shows a wake shield 126 embodying this invention wherein the experiment region 128 is placed on the convex side facing the wake direction and the support equipment is on the concave side facing the ram direction. As shown outgassing molecules from the ram side and ambient scattered molecules are prevented from reaching the experiment region, and a higher level of vacuum is maintainable at that location.

In order to avoid loss of vacuum level by contamination from space shuttle or other space vehicle, it is preferred to operate the wake shield facility as a free-flyer remote from other space vehicles. When Space Station becomes available the wake shield could be serviced in orbit from the station. Equipment and supplies necessary for self-sustaining operation would be provided in the form of packages or modules contained in the support area as described above. Attitude control during flight as well as during preparatory maneuvers as described above would be obtained by use of conventional CMG devices or other orientation control devices such as thrusters or magnetic torquers.

In addition to MBE and vapor phase epitaxial crystal growth processes the wake shield facility of this invention may be adapted for performance of various other processes requiring an ultra-high vacuum, including coating of large mirrors or other optical components, material ultra-purification processes, and fundamental research on ultra-clean surfaces.

Although the wake shield in the embodiment described above is in the shape of a truncated hemispherical section, other convex curve, hemispherical or conical shapes that are concave to the ram direction may be used.

The invention provides vastly higher vacuum levels than ground-based UHV chambers and reduces contamination effects inherent in prior space vacuum facility concepts. Cost and complexity of final cleaning and bake-out steps in orbit are greatly reduced by use of the natural environment, that is, atomic oxygen and solar heating in performing these steps prior to operation. The capability for performing MBE processes under contamination-free conditions and much higher vacuum levels enhances this important process in its ability to fabricate ultrastructural electronic and photonic materials to atomic precision with unprecedented purity. Electronic properties of such materials can be engineered to specific device applications, which translates into vast improvements in device performance.

While a preferred embodiment of the invention has been described using specific terms, such description is for illustrative purposes only, and it is to be understood that changes and variations may be made without departing from the spirit or scope of the following claims.

What is claimed is:

1. Apparatus for processing materials in space under ultra-high vacuum conditions comprising:
    a curved wake shield having a convex side and a concave side and adapted to be placed in orbit with its convex side oriented in the wake direction and its concave side oriented in the ram direction;
    material sample supporting means secured to said wake shield on said convex side in proximity to the apex thereof;
    processing means secured to said wake shield on its convex side in proximity to and in operating relation with said sample supporting means; and
    process support means secured to said wake shield on its concave side.

2. Apparatus as defined in claim 1 wherein said wake shield is in the form of a truncated, hollow hemispherical section.

3. Apparatus as defined in claim 2 including attitude control means disposed on the concave side of said wake shield.

4. Apparatus as defined in claim 2 wherein said material sample supporting means comprises a carousel adapted to support a plurality of material samples so that substrates thereof may be selectively exposed for processing.

5. Apparatus as defined in claim 2 wherein said processing means comprises an arm pivotally mounted on the convex side of said wake shield and an MBE gun supported by said arm and adapted to be pointed to the surface of said sample material and to produce and project upon said surface a stream of vaporized processing material.

6. Apparatus as defined in claim 5 wherein said MBE gun includes a chamber having an RF coil therein defining a central region wherein process material may be levitated during heating.

7. Apparatus as defined in claim 5 wherein said MBE gun includes a chamber in which the position of a melt of process material is controlled by surface tension effects.

8. Apparatus as defined in claim 3 wherein said attitude control means comprises a control moment gyroscope assembly.

9. Apparatus as defined in claim 2 wherein the surface of said wake shield is made of a low-outgassing metal.

10. Apparatus as defined in claim 2 wherein said wake shield is arranged so as to prevent ambient molecules which encounter the shield on the concave side from being projected with thermal velocities onto said convex side.

11. Apparatus as defined in claim 10 wherein said sample supporting means is positioned so that no portion of the wake shield is located in the field of view of a sample supported therein.

12. Apparatus as defined in claim 11 including diagnostic equipment disposed on said convex side.

13. Apparatus as defined in claim 12 wherein said processing means and said diagnostic means are extendable outward to an operating position and retractable inward to a storage position when not in use.

14. Apparatus as defined in claim 13 wherein said process support equipment is disposed within the curved region enclosed by said wake shield so as to prevent outgassing molecules emanating therefrom from being projected with thermal velocities onto said convex side.

15. The method of processing material in space which comprises placing in orbit a curved wake shield apparatus having a processing region on its convex side and an equipment region on its concave side, orienting said apparatus so that the convex side is pointed in the wake direction and conducting processing steps while said wake shield is so oriented.

16. The method of preparing a wake shield apparatus for use in ultra-high vacuum processing of material in space, said wake shield having a truncated hemispherical shape and having the material to be processed and processing fixtures mounted on its convex side and support equipment components mounted on its concave side, which comprises first orienting said wake shield so that its convex side is pointed in the ram direction, maintaining said orientation until the surface of said convex side is cleaned by exposure to atomic oxygen, then orienting the wake shield so that its convex side is pointed to the sun and maintaining that orientation until said surface is baked out by solar heating and orienting the baked out shield for operation with its convex side pointed in the wake direction.

* * * * *